United States Patent
Vanneste et al.

(10) Patent No.: US 10,604,085 B2
(45) Date of Patent: Mar. 31, 2020

(54) METHOD AND MANUFACTURING A DECORATIVE LINING FOR A VEHICLE INTERIOR ELEMENT

(71) Applicants: PSA AUTOMOBILES S.A., Poissy (FR); REYDEL AUTOMOTIVE FRANCE SAS, Harnes (FR)

(72) Inventors: Pascal Vanneste, Vert St Denis (FR); Frederic Rousseau, Gallardon (FR); Jacques Matusik, Montigny le Bretonneux (FR); Olivier Hochart, Noyelles les Vermelles (FR); Claire Bony, Flers en Escrebieux (FR); Olivier Baran, Carvin (FR)

(73) Assignees: PSA Automobiles SA, Poissy (FR); Reydel Automotive France SAS, Harnes (FR)

( * ) Notice: Subject to any disclaimer, the term of this patent is extended or adjusted under 35 U.S.C. 154(b) by 0 days.

(21) Appl. No.: 16/081,767

(22) PCT Filed: Feb. 28, 2017

(86) PCT No.: PCT/FR2017/050442
§ 371 (c)(1),
(2) Date: Dec. 27, 2018

(87) PCT Pub. No.: WO2017/149235
PCT Pub. Date: Sep. 8, 2017

(65) Prior Publication Data
US 2019/0337468 A1    Nov. 7, 2019

(30) Foreign Application Priority Data
Mar. 2, 2016  (FR) ..................... 16 51782

(51) Int. Cl.
*B60R 13/00* (2006.01)
*B60R 13/02* (2006.01)
*C14B 1/56* (2006.01)

(52) U.S. Cl.
CPC ............ *B60R 13/005* (2013.01); *B60R 13/02* (2013.01); *C14B 1/56* (2013.01); *B60R 2013/0281* (2013.01); *B60R 2013/0293* (2013.01)

(58) Field of Classification Search
CPC .................. B60R 13/005; B60R 13/02; B60R 2013/0281; B60R 2013/0293; C14B 1/56
See application file for complete search history.

(56) References Cited

U.S. PATENT DOCUMENTS

2003/0180498 A1*  9/2003  De Winter .............. B29C 33/12
                                                                    428/67

FOREIGN PATENT DOCUMENTS

DE     102014201730 A1   10/2014
EP         1177949 A1    2/2002
(Continued)

OTHER PUBLICATIONS

WIPO provided English translation of the Written Opinion for corresponding PCT PCT/FR2017/050442, dated Jun. 9, 2017.
(Continued)

*Primary Examiner* — John C Hong
(74) *Attorney, Agent, or Firm* — Sandberg Phoenix & von Gontard, P.C.

(57) ABSTRACT

A method for manufacturing a decorative lining (HD) for a vehicle interior element (EH) is disclosed. Said method involves: —step (i) wherein the size of at least one edge (B11, B12) of two leather parts (PC1, PC2) is reduced on an inner face (FI1) and each reduced-size edge is folded over to form a fold (R1, R2) on each leather part (PC1, PC2); and
(Continued)

—step (ii) wherein the leather parts (PC1, PC2) as well as a decorative insert (ID) that is inserted between the two leather parts (PC1, PC2) are coupled to the vehicle interior element (EH) by placing two edges (B21, B22) underneath the folds (R1, R2).

15 Claims, 4 Drawing Sheets

(56) References Cited

FOREIGN PATENT DOCUMENTS

| FR | 2 985 696 A1 | 7/2013 |
|---|---|---|
| JP | 2006116062 A | 5/2006 |

OTHER PUBLICATIONS

International Search Report for corresponding PCT PCT/FR2017/050442, dated Sep. 6, 2017.
Written Opinion for corresponding PCT PCT/FR2017/050442, dated Sep. 6, 2017.

* cited by examiner

METHOD AND MANUFACTURING A DECORATIVE LINING FOR A VEHICLE INTERIOR ELEMENT

CROSS-REFERENCE TO RELATED APPLICATIONS

This application is filed under 35 U.S.C. § 371 to continue International App. No. PCT/FR2017/050442 filed on Feb. 28, 2017 which claims the priority to French application 1651782 filed on Mar. 2, 2016, both of which are incorporated herein by reference.

BACKGROUND

The invention relates to the manufacturing of decorative linings for vehicle interior elements.

As is known by the person skilled in the art, many processes (or methods) have been proposed to manufacture decorative linings for vehicle interior elements, for example, a dashboard, a door panel, a roof, a dome light, a center console, a glove compartment cover, a center shell of a steering wheel, or a seat.

Thus, it is possible to secure to the interior element a synthetic insert comprising an external face that is eventually grained and/or painted, or covered by a synthetic overmolding (or cladding), optionally with the insertion of a thin foam layer, or even covered by a thick foam layer, which itself is covered by a synthetic hide.

These processes (or methods) all present at least one disadvantage. Indeed, they lead to a rather unaesthetic aspect and/or a visible joint surface and/or a poorly controlled glossiness of the grain and/or an elongation of the grains that follows the surface shape of the element. More generally, the result of the implementation of these processes is not readily compatible with a perceived high end quality.

Admittedly, to improve the perceived quality, it is also possible to join leather to the interior element. However, this does not offer any diversity, and therefore does not allow instant differentiation from one model to another within a brand, or from one brand to another, or even to personalize the vehicle interiors on the basis of the wishes of their owners.

SUMMARY

The purpose of the invention is therefore to improve the situation.

For this purpose, a method is proposed that is intended to allow the achievement of a decorative lining on a vehicle interior element, comprising:
  a step (i) wherein the size of at least one edge of two leather parts is reduced on an inner face, and each reduced-size edge is folded over to form a fold on each leather part, and
  a step (ii) wherein the leather parts, as well as a decorative insert that is inserted between the two leather parts are coupled to this element by placing two edges underneath the folds.

Such a method allows for the perceived quality of the interiors to be substantially improved and to offer a great diversity of differentiation and personalization.

The method may comprise other features which can be taken separately or in combination, and in particular:
  in a first illustrative embodiment, one can begin in step (ii) by coupling the decorative insert in a selected location of the interior element; subsequently one can couple each leather part to the interior element covering the two edges of the decorative insert with at least a portion of the folds;
  in step (ii), one can firmly join the leather parts and the decorative insert onto an outer face of an interface layer which has previously been firmly united to an external face of the interior element;
  in a second embodiment, it is possible, in step (i), prior to carrying out the fold-over, to firmly unite a support part onto an outer face of one of the leather parts, at the height of its reduced-size edge. One can then fold each reduced-size edge in order to form folds, one of which is lengthened by the support part which is united to it. In this case, in step (ii), one can couple the leather parts to the interior element, with the support part lengthening one of their folds, in such a way that it separates these leather parts having placed two of its edges underneath the folds. One can then firmly unite the decorative insert onto the support part by respectively placing its two edges underneath the two folds;
  in a third embodiment, it is possible, in step (i), prior to carrying out the fold-over, to firmly unite a support part, equipped with the decorative insert, onto an outer face of one of the leather parts, at the height of its reduced-size edge. One can then fold over each reduced-size edge in order to create folds, one of which is lengthened by the support part to which it is united. In this case, in step (ii), one can couple the leather parts to the element with the support part that lengthens one of their folds, in such a way that it separates these leather parts by having two of its edges placed underneath the folds and an upper face equipped with the decorative insert with its two edges respectively placed underneath the two folds;
  in step (i), prior to carrying out the firm uniting of the support part onto an outer face of one of the leather parts, one can glue the decorative insert onto the upper face of the support part;
  in step (ii), one can firmly unite the leather parts, apart from their folds, onto an outer face of an interface layer that has previously been firmly united to an outer face of the element and that has interruptions at the height of each of the folds and of the support part. As a variant, in step (ii), one can firmly unite the leather parts and the support part, apart from the portions located underneath the folds, onto an outer face of an interface layer that has previously been firmly united to an outer face of the element and that has interruptions at the height of each of the folds;
  in the second and third embodiments, one can, in step (ii), firmly unite the leather parts as well as the support part that was previously equipped with a strip of divider material on a portion of a lower face located underneath the decorative insert onto an outer face of the element;
  in a fourth embodiment, one can, in step (i), prior to carrying out the fold over, firmly unite a support part onto an outer face of each leather part, at the height of its reduced-size edge, then, one can subsequently fold each reduced-size edge over in order to form folds that are each lengthened by the united support part. In this case, in step (ii), one can couple the leather parts to the element with the support parts lengthening their fold in such a manner that they mutually extend one another. One can then firmly unite the decorative insert onto the support parts, by respectively placing its two edges underneath the two folds;

in the second and fourth embodiment, and in certain variants of the third embodiment, one can, in step (ii), firmly unite the leather parts and each support part onto an outer face of an interface layer that has previously been firmly united to an outer face of the interior element;

in the four embodiments, the optional interface layer can be selected from amongst (at least) a cladding united by heating to the interior element, a foam united by gluing to the interior element, and a cladding united by foaming to the interior element;

in step (i), after having folded over the reduced-size edges by overlaying two subsections, one can unite these subsections to one another by stitching;

in step (i), one can reduce the thickness of at least one edge of each leather part over at least one half or its thickness.

Also proposed is an element intended to outfit a vehicle interior comprising a decorative lining manufactured by means of a manufacturing method of the type presented here above.

Also proposed is a vehicle comprising an interior comprising at least one element of the type presented here above.

DESCRIPTION OF THE DRAWINGS

Other features and advantages will appear upon examination of the detailed description that follows, and of the attached drawings, in which.

DETAILED DESCRIPTION

In particular, we propose a method intended to allow the manufacture of a decorative lining HD on an element EH of a vehicle interior.

In that which follows, one considers, by way of a non-limiting example, that the interior element EH is a portion of a dashboard intended to be visible on the inside of a vehicle interior. However, the method is not limited to this type of interior element. It does indeed relate to any element whatsoever that presents at least one outer face intended to be visible on the inside of a vehicle interior and to comprise a decorative lining. Thus, in particular, it relates to dashboards, door panels, roofs, dome lights, center consoles, glove compartment covers, center shells of steering wheels and seats (seat base, backrest and headrest).

Moreover, hereinafter, by way of non-limiting example, it is considered that the vehicle is of the automobile type. This includes, for example, a car. However, the method is not limited to this type of vehicle. It does indeed relate to any type of land, sea (or waterways), or air vehicle.

The manufacturing method comprises two steps: (i) and (ii), that are implemented when one has two leather parts PCj (j=1 or 2), each having an inner face FI1 intended to be oriented towards an interior element EH, and an outer face FE1 opposite to the inner face FI1 and visible in the interior.

Figure 1:
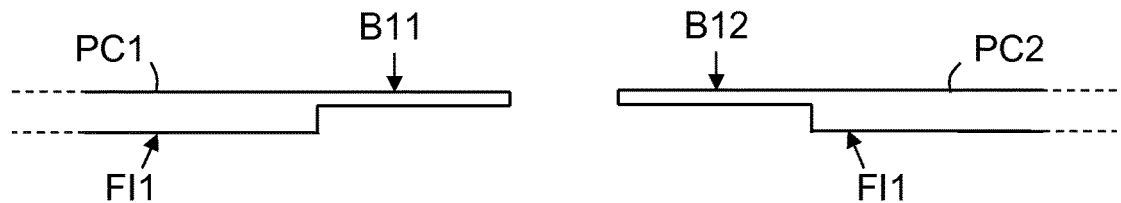
FIG. 1 schematically illustrates, in a cross-sectional view, portions of two leather parts after the reduction in size of one of their edges during a step (i) of a method, FIG. 2 schematically illustrates, in a cross-sectional view, the leather parts of FIG. 1 after the folding over of their reduced-size edge, during step (i) of a first embodiment of the method, FIG. 3 schematically illustrates, in a cross-sectional view, the coupling of a decorative insert to an interior element equipped with an interface layer, during step (ii) of the first embodiment of the method, FIG. 4 schematically illustrates, in a cross-sectional view, the interior element of FIG. 3 equipped with its decorative lining, at the end of step (ii) of the first embodiment of the method, FIG. 5 schematically illustrates, in a cross-sectional view, portions of two leather parts after the reduction in thickness of one of their edges and the uniting of a support part to one of the two reduced-size edges, during a step (i) of a second embodiment of the method, FIG. 6 schematically illustrates, in a cross-sectional view, the leather parts of FIG. 5 after the folding over of their reduced-size edge, during step (i) of the second embodiment of the method, FIG. 7 schematically illustrates, in a cross-sectional view, an interior element equipped with an interface layer and with a decorative lining, at the end of step (ii) of the second embodiment of the method, FIG. 8 schematically illustrates, in a cross-sectional view, portions of the two leather parts after the reduction of the thickness of one of their edges and uniting of a support part, equipped with a decorative insert, to one of the two reduced-size edges, during a step (i) of a third embodiment of the method, FIG. 9 schematically illustrates, in a cross-sectional view, the leather parts of FIG. 8 after the folding over of their reduced-size edge, during step (i) of the third embodiment of the method, FIG. 10 schematically illustrates, in a cross-sectional view, an interior element equipped with an interface layer and with a decorative lining, at the end of step (ii) of the third embodiment of the method, FIG. 11 schematically illustrates, in a cross-sectional view, an interior element equipped with an interface layer and with a decorative lining, at the end of a first variant of step (ii) of the third embodiment of the method, FIG. 12 schematically illustrates, in a cross-sectional view, an interior element equipped with an interface layer and with a decorative lining, at the end of a second variant of step (ii) of the third embodiment of the method, FIG. 13 schematically illustrates, in a cross-sectional view, portions of two leather parts after reduction of the thickness of one of their edges and uniting of a support part to each of these two reduced-size edges, during a step (i) of a fourth embodiment of the method, FIG. 14 schematically illustrates, in a cross-sectional view, the leather parts of FIG. 13, after the folding over of their reduced-size edge, during step (i) of the fourth embodiment of the method, and FIG. 15 schematically illustrates, in a cross-sectional view, an interior element equipped with an interface layer and with a decorative lining, at the end of step (ii) of the fourth embodiment of the method.

A first step (i) of the method comprises reducing the thickness of at least one edge B1j of each of the two leather parts PCj on their inner faces FI1 (as illustrated in FIG. 1), then in the folding over of each reduced-size edge B1j in order to create a fold Rj on each leather part PCj (as illustrated in FIGS. 2, 6, 9 and 14).

The action of reducing the thickness of the edges B1j is at times called "skiving". It can be achieved manually or by means of a skiving knife or automatically by means of a machine adapted for this purpose.

For example, each fold Rj can be made sustainable by uniting the two folded subsections SPk (k=1 or 2) of each reduced-size edge B1j. This uniting can be achieved by means of decorative stitching (or using a topstitch) CD (as illustrated in FIGS. 2, 6, 9 and 14), or by gluing.

A second step (ii) of the method comprises coupling the leather parts PCj and a decorative insert ID to the element EH. The decorative insert (ID) is inserted between the leather parts PCj and has two opposing edges B2j placed underneath the folds Rj of the leather parts PCj, as illustrated in FIGS. 4, 7, 10 and 15. The decorative insert ID thereby comprises a decorative strip separating the two leather parts PCj and is visible in the space defined between the two folds Rj.

It is noted that the steps (i) and (ii) can be implemented in a same location or in different locations.

A multitude of embodiments can be envisioned to implement these two steps (i) and (ii). Four of these embodiments are hereinafter described, as illustrative examples, in reference to FIGS. 1 through 4, FIGS. 5 through 7, FIGS. 8 through 12, and FIGS. 13 through 15, respectively.

Figure 2:
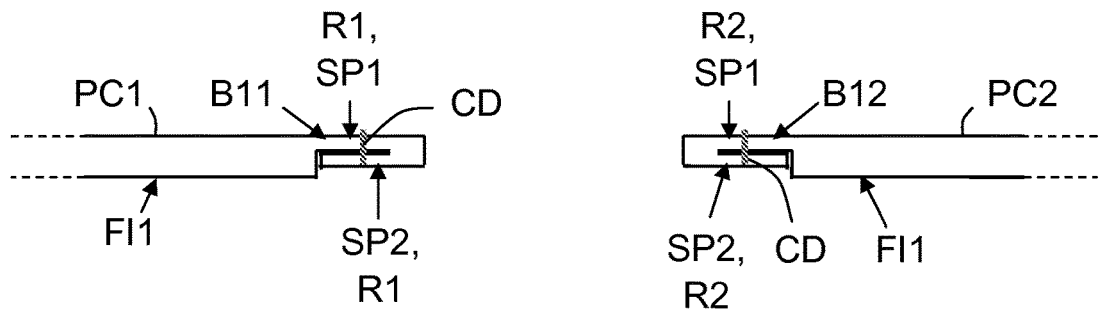

A first embodiment is illustrated in non-limiting manner in FIGS. 1 through 4. It comprises a first step (i), in which at least one reduced-size edge B1j is formed on at least the inner face FI1 of the two leather parts PCj (as illustrated in FIG. 1). Then a fold Rj with each reduced-size edge B1j (as illustrated in FIG. 2) is made.

Figure 3:
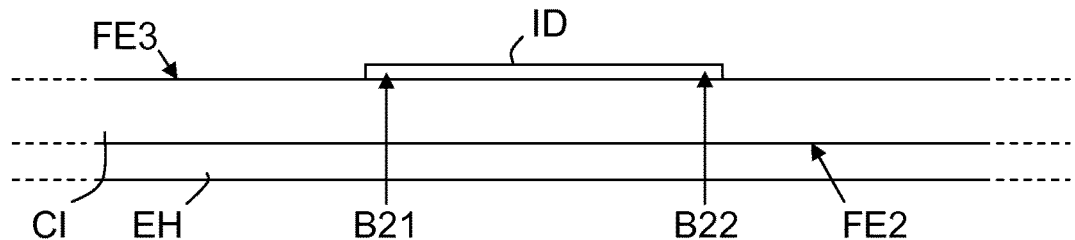

In the second step (ii), first the decorative insert ID is coupled in a selected location of the interior element EH (as illustrated in FIG. 3). Then each leather part PCj is coupled to this interior element EH covering the two edges B2j of the decorative insert ID with at least a portion of the folds Rj.

Figure 4:
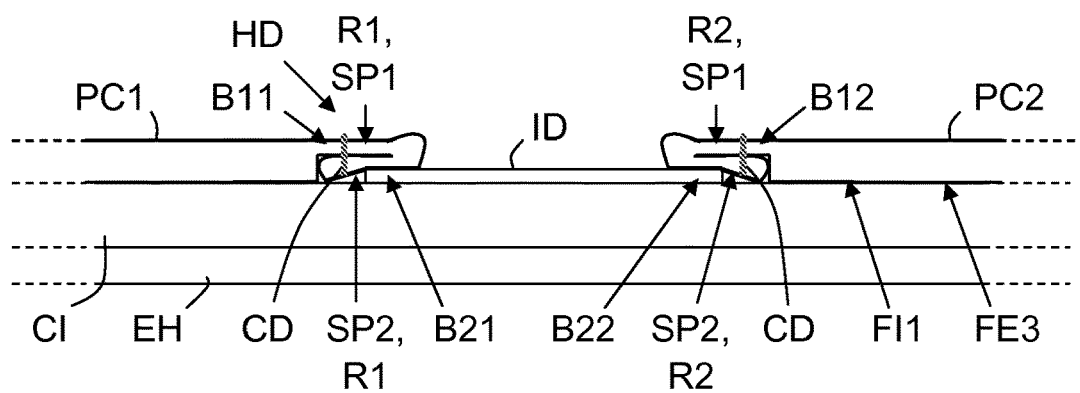

It is noted that, in the non-limiting example illustrated in FIGS. 3 and 4, that the decorative insert ID and the leather parts PCj are coupled to the interior element EH via an interface layer CI. More specifically, the leather parts PCj and the decorative insert ID are firmly secured onto an outer face FE3 of an interface layer CI which has previously been firmly united to an outer face FE2 of the interior element EH.

This interface layer CI can, for example, be a cladding (or hide) united by heating ("thermocladding") to the interior element, a foam united by gluing to the interior element, or a cladding (or hide) united by foaming to the interior element. The cladding (or hide) can, for example, be manufactured of polypropylene (PP, P/E-MD15, or PP-MD20). Foam is preferably intended to confer a sensation of softness. It can, for example, be manufactured of polyurethane (PU).

The firm uniting of the leather parts PCj and of the decorative insert ID onto the outer face FE3 of the interface layer CI can, for example, be achieved by gluing.

In this first embodiment, the leather parts PCj are coupled to the interior element EH, after the decorative insert ID has been coupled to the interior element. As a consequence, it is not necessary to accommodate the opposite edges B2j of the decorative insert ID underneath the folds Rj, which would require that the decorative insert ID be at least slightly flexible (or supple). It therefore follows that the decorative insert ID can be rigid or flexible.

Figure 5:
Figure 6:
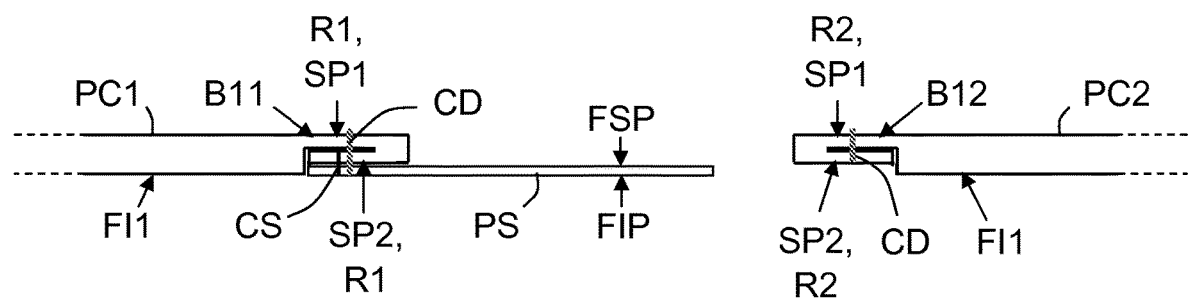
Figure 7:
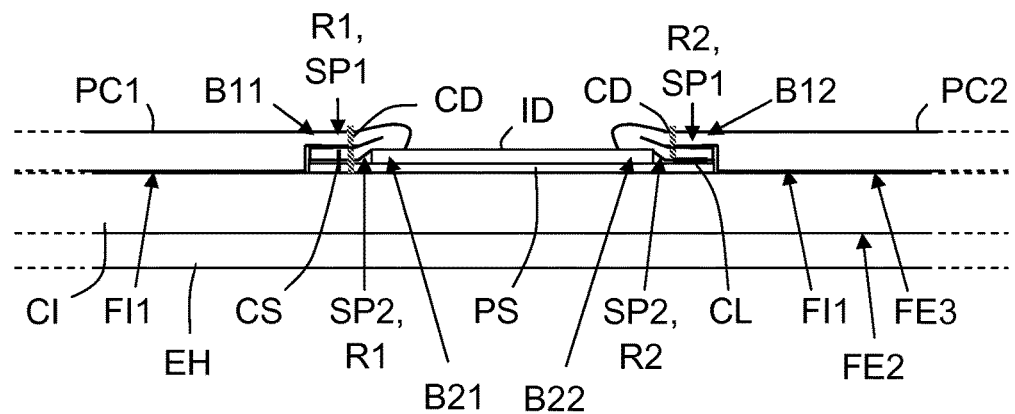

A second embodiment is illustrated, in a non-limiting manner, in FIGS. 5 through 7. The second embodiment of the method comprises a first step (i) wherein at least one reduced-size edge B1j is defined on the inner face FI1 of the two leather parts PCj (as illustrated in FIG. 1). Then, prior to carrying out the folding over of the reduced-size edges B1j, a support part PS is firmly united onto the outer face FE1 of any one of the two leather parts PCj (here PC1), at the height of its reduced-size edge B1j (here B11). This uniting can be carried out by stitching CS (as illustrated in FIGS. 5 through 7) and/or by gluing. Then, each reduced-size edge B1j is folded over in order to make folds Rj. As illustrated in FIG. 6, the creation of the fold R1 by folding ensures that the fold R1 is lengthened by the support part PS1 which is united to it.

It is noted that the support part PS can, for example, be made of a textile material (woven or non-woven) or of leather or even of rigid or flexible (or supple) synthetic material, such as for example PVC.

In the second step (ii), the leather parts PCj are coupled to the interior element EH with the support part PS which lengthens one of their folds Rj (here R1) in such a way that the support part PS separates these leather parts PCj, having two of its edges placed underneath the two folds Rj.

The second leather part PC2 is united to the upper face FSP of the support part PS, for example by gluing CL.

Then, the decorative insert ID is firmly united onto the support part PS by respectively placing its two edges B2j underneath its two folds Rj, as illustrated in FIG. 7.

It is noted that in the non-limiting example illustrated in FIG. 7, the support part PS, the decorative insert ID and the leather parts PCj are coupled to the interior element EH via an interface layer CI. More precisely, the leather parts PCj and the support part PS are firmly united onto an outer face FE3 of an interface layer CI which was previously firmly united to an outer face FE2 of the interior element EH, and the decorative insert ID is firmly united onto the upper face FSP of the support part PS.

This interface layer CI can, for example, be a cladding (or hide) united by heating ("thermocladding") or a foam united by gluing or even a cladding (or hide) united by foaming. The cladding (or hide) can, for example, be manufactured of polypropylene. Foam is preferably intended to confer a sensation of softness. It can, for example, be manufactured of polyurethane.

The firm uniting of the leather parts PCj and of the support part PS onto the outer face FE3 of the interface layer CI can, for example, be carried out by gluing. Likewise, the firm uniting of the decorative insert ID onto the upper face FSP of the support part PS can, for example, be carried out by gluing. Moreover, one can firmly unite the second subsection SP2 of the fold R2 (which is not united to the support part PS), to the support part PS, for example, by gluing.

In this second embodiment, the leather parts PCj are coupled to the interior element EH, before the decorative insert ID has been coupled to the latter (EH), via the support part PS. As a consequence, it is necessary to accommodate the opposite edges B2j of the decorative insert ID underneath the folds Rj (and more specifically between the folds Rj and opposite edges of the support part PS). This requires that the decorative insert ID be at least slightly flexible (or supple).

Figure 8:
Figure 9:
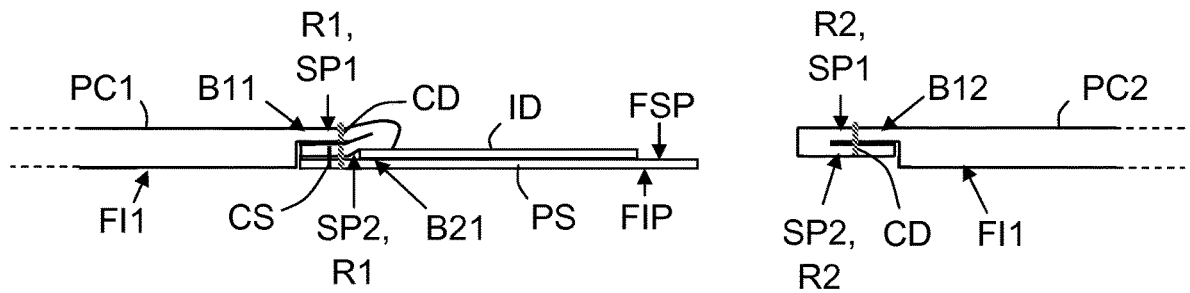
Figure 10:
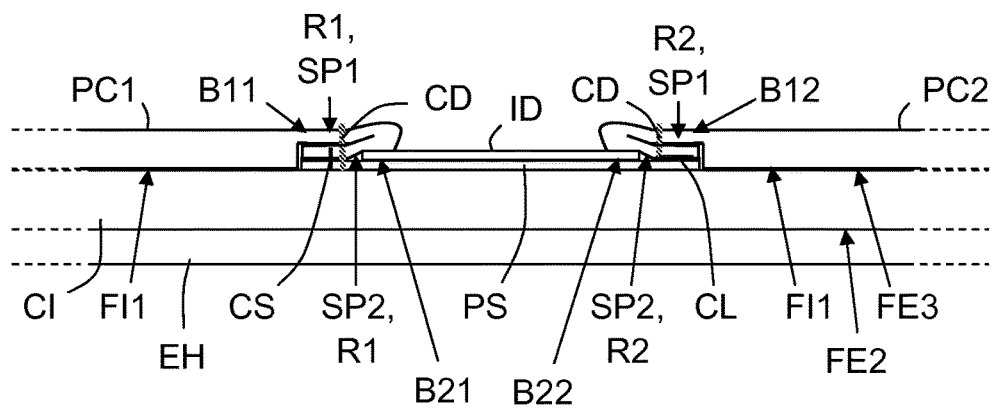

A third embodiment is illustrated in a non-limiting manner in FIGS. 8 through 10. It comprises a first step (i) wherein at least one reduced-size edge B1j is defined on the inner face FI1 of the two leather parts PCj (as illustrated in FIG. 1). Then, before folding over the reduced-size edges B1j, a support part PS, equipped on its upper face FSP with a decorative insert ID, is united onto the outer face FE1 of one of the two leather parts PCj (here PC1), at the height of its reduced-size edge B1j (here B11). This uniting can be achieved by means of stitching CS (as illustrated in FIGS. 8 through 10) and/or by gluing.

It is noted that in the first step (i), before carrying out the firm uniting of the support part PS onto the outer face FE1 of one of the leather parts PCj, the decorative insert ID can be glued onto the upper face FSP of the support part PS. This gluing can even be achieved before the definition of the reduced-size edges B1j on the inner faces FI1 of the two leather parts PCj.

It is also noted that the support part PS can, for example, be made of textile material (woven or non-woven), or of leather, or even of rigid or flexible (or supple) synthetic material, such as, for example, PVC.

Then, each reduced-size edge B1j is folded over in order to create folds Rj. As illustrated in FIG. 9, the creation of the fold R1 by folding over ensures that the fold R1 is found to be lengthened by the support part PS1 (with its decorative insert ID) to which it is united.

In the second step (ii), the leather parts PCj are coupled to the interior element EH with the support part PS which lengthens one of their folds Rj (here R1) in such a manner that the support part PS separates these leather parts PCj, by having two of its edges placed underneath the two folds Rj and its upper face FSP equipped with the decorative insert ID with its two edges B2j respectively placed underneath the two folds Rj.

The second leather part PC2 is united to the upper face FSP of the support part PS, for example by gluing CL.

It is noted that in the non-limiting example illustrated in FIG. 10, the support part PS, the decorative insert ID and the leather parts PCj are coupled to the interior element EH via an interface layer CI. More specifically, the leather parts PCj and the support part PS (with its decorative insert ID) are firmly secured onto one outer face FE3 of an interface layer CI which has previously been firmly united to an outer face FE2 of the interior element EH.

This interface layer CI can, for example, be a cladding (or hide) united by heating ("thermocladding") or a foam united by gluing or even a cladding (or hide) united by foaming. The cladding (or hide) can, for example, be manufactured of polypropylene. The foam is preferably intended to confer a sensation of softness. It can, for example, be manufactured of polyurethane.

The firm uniting of the leather parts PCj and of the support part PS on the outer face FE3 of the interface layer CI can, for example, be achieved by gluing. Likewise, the firm uniting of the decorative insert ID onto the upper face FSP of the support part PS can, for example, be achieved by gluing. Moreover, one can firmly unite the second subsection SP2 of the fold R2 (which is not united to the support part PS) to the support part PS, for example by gluing.

Figure 11:
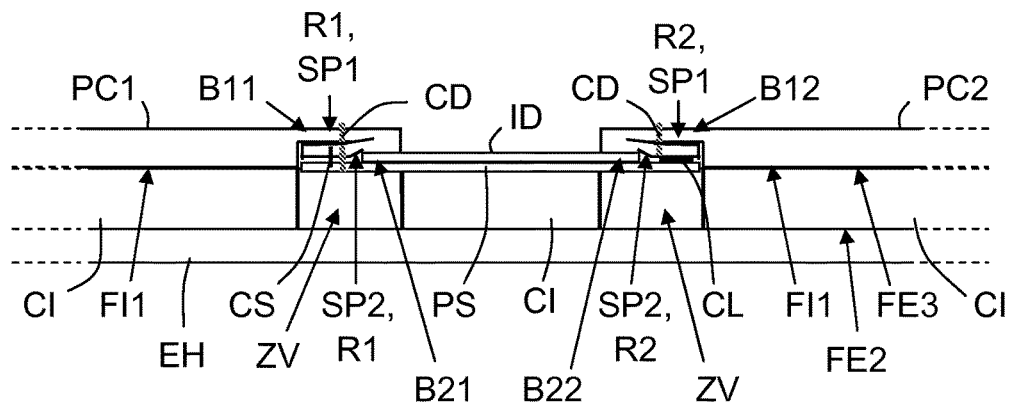

In a first embodiment variant, illustrated in a non-limiting manner in FIG. 11, the interface layer CI can partially extend underneath the leather parts PCj and the support part PS. More specifically, in a second step (ii), the leather parts PCj, apart from their folds Rj, can be firmly united onto the outer face FE3 of an interface layer CI that has previously been firmly united to the outer face FE2 of the element EH and interrupted at the height of each of the folds Rj.

In other words, the interface layer CI is manufactured of three subsections, with every two subsections being separated by empty areas ZV, in such a way as to ensure that interface layer is not present underneath each of the two folds Rj. The empty areas ZV that are interspersed between two subsections of the interface layer CI can be defined, for example, by laser etching or by milling (however, any other method can be contemplated).

These empty areas ZV defined underneath the folds Rj are intended to avoid the formation of bulges at the extremities of the folds Rj, and to absorb the excess thicknesses linked to the fold of the leather and the assembly of the support part PS.

Figure 12:
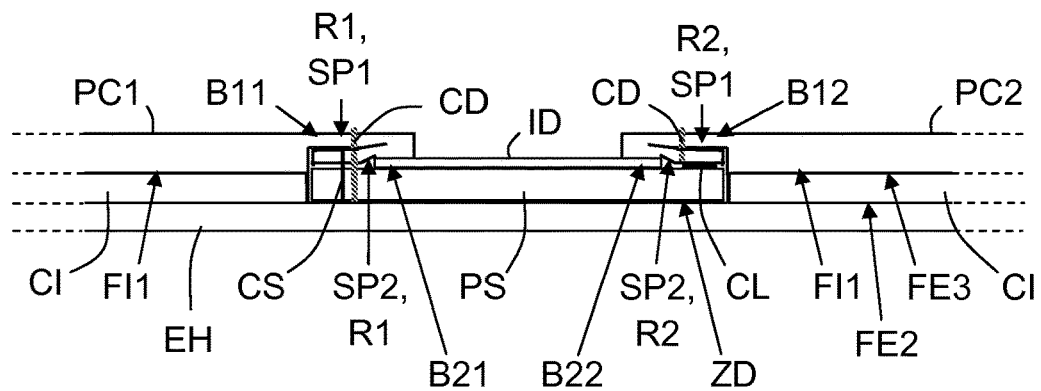

In a second embodiment, illustrated in a non-limiting manner in FIG. 12, the interface layer CI can partially extend underneath the leather parts PCj, however not underneath the support part PS. More specifically, in the second step (ii), one can firmly unite the leather parts PCj and the support part PS, apart from the portions located underneath the folds Rj, onto the outer face FE3 of an interface layer CI that was previously firmly united to the outer face FE2 of the element EH and interrupted at the height of each of the folds Rj and of the support part PS.

In other words, the interface layer CI is manufactured of two subsections, separated one from the other by an area ZD (devoid of matter), in such a way as to not be present underneath the two folds Rj nor underneath the support part PS. The area ZD intermediately located between the two subsections of the interface layer CI can be defined, for example, by a laser etching or a milling (however, any other method can be envisaged).

This area ZD defined underneath the folds Rj and underneath the support part PS is intended to avoid the formation of bulges at the extremities of the folds (Rj), and to absorb the excess thicknesses linked to the fold of the leather and the assembly of the support part PS.

One will note, as illustrated in a non-limiting manner in FIG. 12, that to bridge the area ZD, one can use a support part PS that presents a greater thickness than presented by the same in the other embodiment examples.

One will likewise note that in at least any one of the first, second and third embodiments, one can, in the second step (ii), firmly unite onto the outer face FE2 of the element EH, the leather parts PCj and the support part PS that has previously been equipped with a strip of divider material on a portion of a lower face FIP located underneath the decorative insert ID. The lower face FIP is the one which is opposite to the upper face FSP of the support part PS.

This strip of divider material can, for example, be manufactured of leather or plastics (or synthetic) material. It is intended to reduce the difference in thickness between each fold Rj and the decorative insert ID, and confers a domed aspect to the insert ID, in the space defined between the two folds Rj.

One will note that the divider material strip can, for example, be glued onto the lower face FIP of the support part PS. This gluing can be achieved in the first step (i), prior to the firm uniting of the support part PS onto the outer face FE1 of any one of the leather parts PCj. This gluing can even be achieved prior to the definition of the reduced-size edges B1j on the inner faces FI1 of the two leather parts PCj. As a variant, this gluing can be achieved at the end of the first step (i), or rather at the start of the second step (ii), prior to the uniting to the outer face of the interior element EH or of the interface layer CI.

One will likewise note that the use of a strip of divider material can, for example, be made when one does not use any interface layer CI. However, one can likewise have a strip of divider material in the event in which there is no interface layer CI, as well as also in the event in which there was an interface layer CI underneath the leather, but not underneath the support part PS.

Figure 13:
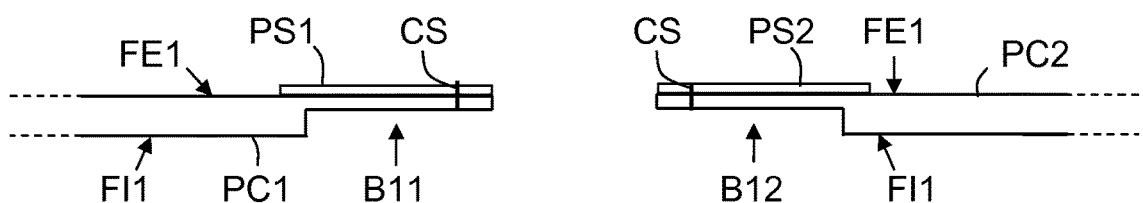
Figure 14:
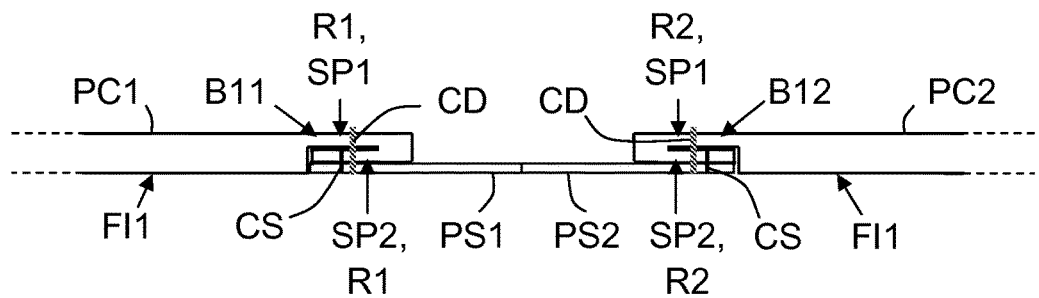
Figure 15:
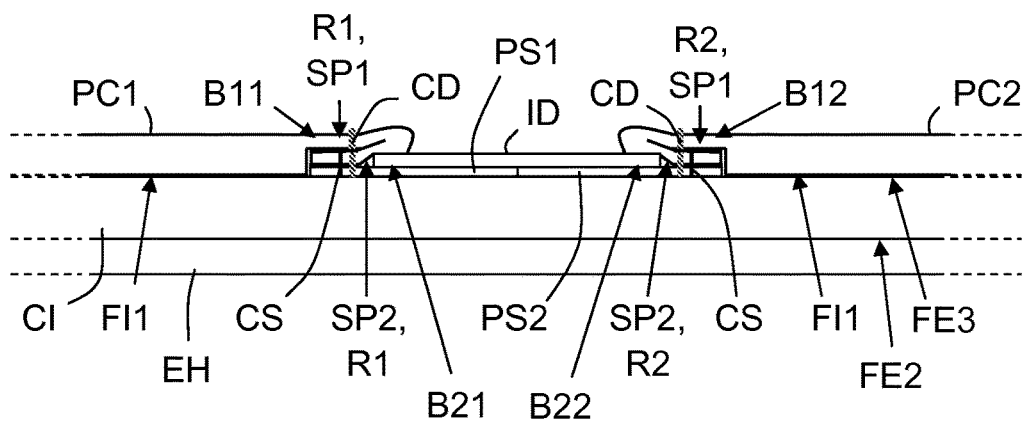

A fourth embodiment is illustrated in a non-limiting manner in FIGS. 13 through 15. It comprises a first step (i) in which one defines at least one reduced-size edge B1j on the inner face FI1 of the two leather parts PCj (as illustrated in FIG. 1). Then, before carrying out the folding over of the reduced-size edges B1j, one firmly unites a support part PSj onto the outer face FE1 of each of the two leather parts PCj, at the height of its reduced-size edge B1j, then one folds over each reduced-size edge B1*j* in order to form folds R*j*. As illustrated in FIG. 14, the creation of the two folds R*j* by folding over ensures that the folds R*j* are both lengthened by the support parts PS*j* which are united to the same.

These last examples of uniting can be made by means of stitching CS and/or by gluing. One will note that the support parts PS*j* can, for example, be made of textile material (woven or non-woven) or of leather or even of rigid or flexible (or supple) synthetic material, such as, for example, PVC.

In the second step (ii), to the interior element EH, one couples the leather parts PC*j* with the support parts PS*j* which lengthen their respective folds R*j* in such a way that the support parts PS*j* are mutually lengthened (and thus separate these leather parts PC*j*).

The free ends of the support parts PS*j* can be united one to the other, for example by gluing and/or stitching. In this case, the same induces a slight local excess overlap thickness of these free ends (which does not appear in FIGS. 14 and 15). One will note that this uniting is preferably made at the end of the first step (i). However, it can likewise be done at the start of the second step (ii), prior to proceeding with the coupling.

Then, one firmly unites the decorative insert ID onto the support parts PS, by respectively placing its two edges B2*j* underneath the two folds R*j*, as illustrated in FIG. 15.

One will likewise note that in the non-limiting example illustrated in FIG. 15, the support parts PS*j*, the decorative insert ID and the leather parts PC*j* are coupled to the interior element EH via an interface layer CI. More specifically, one firmly unites the leather parts PC*j* and the support parts PS*j* onto an outer face FE3 of an interface layer CI, which has previously been firmly united to an outer face FE2 of the interior element EH, and one firmly unites the decorative insert ID onto the upper face FSP of the support parts PS*j*.

This interface layer CI can, for example, be a cladding (or hide) united by heating ("thermocladding") or a foam united by gluing or even a cladding (or hide) united by foaming. The cladding (or hide) can, for example, be manufactured of polypropylene. The foam is preferably intended to confer a sensation of softness. It can, for example, be manufactured of polyurethane.

The firm uniting of the leather parts PC*j* and of the support parts PS*j* onto the outer face FE3 of the interface layer CI can, for example, be done by gluing. Likewise, the firm uniting of the decorative insert ID onto the upper face FSP of the support parts PS*j* can, for example, be done by gluing.

In this fourth embodiment, the leather parts PC*j* are coupled to the interior element EH, before the decorative insert ID has been coupled to the interior element EH, via the support parts PS*j*. As a consequence, one is required to accommodate the opposite edges B2*j* of the decorative insert ID underneath the folds R*j* (and more specifically between the folds R*j* and the edges of the support parts PS*j*), which requires that the decorative insert ID is at least slightly flexible (or supple).

One will note that in order to avoid that the folding over of the subsections SP*k* of each reduced-size edge B1*j* provokes a bulge, it is preferable that the reduction of the size is carried out over at least one half of the thickness of the edge B1*j* of each leather part PC*j*. Moreover, to avoid a significant bulge being brought about by the overlap of a fold R*j* and of the edge B2*j* of the decorative insert ID (as well as the eventual edge of a support part PS (or PS*j*)), it is preferable, as illustrated in the figures, that the reduction of the size is carried out on more than half of the thickness of the edge B1*j* of each leather part PC*j*.

Given as a purely illustrative example, the decorative insert ID can comprise small crystals. In this manner, it could, for example, be the product marketed under the brand cristal Fabric® by the company Swarovski. In place of small crystals, one can, for example, use rhinestones. However, in a general manner, any type of decorative insert can be used, whether it comprises an attached element or not.

The method according to the invention offers a multitude of advantages, among which:
 an improvement of the perceived quality of the interiors, which can go so far as to reach an impression of luxury,
 a high degree of diversity, and thus a possibility of differentiation of the models within a brand or between brands,
 a possibility for personalization of the interiors of the vehicles on the basis of the wishes of their owners.

The invention claimed is:

1. A method for manufacturing a decorative lining for a vehicle interior element, the method comprising a step (i), reducing a thickness of at least one edge of two leather parts on an inner face resulting in a reduced-size edge, and folding each reduced-size edge over to form a fold on each leather part, and a step (ii), coupling said leather parts, as well as a decorative insert that is inserted between the leather parts, to said element by placing two edges underneath said folds.

2. The method according to claim 1, wherein said step (ii) comprises initially coupling said decorative insert in a chosen location of said element, then, coupling each leather part to said element covering said two edges of the decorative insert with at least a portion of said folds.

3. The method according to claim 2, said step (ii) further comprises firmly uniting said leather parts and said decorative insert onto an outer face of an interface layer that was previously firmly united to an outer face of said element.

4. The method according to claim 3, wherein said interface layer is selected from amongst a group comprising a cladding united by heating to the interior element, a foam united by adhesion to the interior element, and a cladding united by foaming to the interior element.

5. The method according to claim 1, wherein in said step (i), prior to carrying out said fold over, uniting a support part onto an outer face of each leather part, at the height of its reduced-size edge, then, folding over each reduced-size edge to form folds that are each lengthened by said unitary support part, and, in said step (ii), coupling said leather parts, with said support parts lengthening their folds to said element, in such a manner that they are mutually lengthened, then firmly uniting said decorative insert onto said support parts, respectively placing said support parts two edges underneath said two folds.

6. The method according to claim 5, wherein in said step (ii), firmly uniting said leather parts and each support part onto an outer face of an interface layer that was previously firmly united with an outer face of said element.

7. The method according to claim 1, wherein in said step (i), prior to carrying out said fold over, uniting one support part onto an outer face of one of said leather parts, at the height of its reduced-size edge, then, folding over each reduced-size edge in order to create folds, one of which is lengthened by said support part which is unitary to said support part, and in said step (ii), coupling to said element, said leather parts with said support part lengthening one of their folds in such a manner that said support part separates these leather parts by having two of its edges underneath said folds, then uniting said decorative insert onto said support part, respectively placing its two edges underneath said two folds.

8. The method according to claim 7, wherein in said step (ii), firmly uniting on an outer face of said element, said leather parts and said support part, that is previously equipped with a strip of divider material on a portion of a lower face located underneath said decorative insert.

9. The method according to claim 1, wherein in said step (i), prior to performing said folding, uniting one support part, equipped with said decorative insert, onto an outer face of one of the said leather parts, at the height of its reduced-size edge, then, subsequently folding over each reduced-size edge in order to create folds, one of which is lengthened by said support part which is unitary to it, and in said step (ii), coupling to said element, said leather parts, with said support part lengthening one of their folds in such a manner that said support part separates these leather parts by having two of its edges underneath said folds and one upper face equipped with said decorative insert with its two edges respectively placed underneath said two folds.

10. The method according to claim 9, wherein in said step (i), prior to carrying out said step of firmly uniting the support part onto an outer face of any one of said leather parts, gluing said decorative insert onto to said upper face of the support part.

11. The method according to claim 9, wherein in said step (ii), firmly uniting said leather parts, apart from their folds, onto an outer face of an interface layer previously firmly united to an outer face of said element and interrupted at the height of each of said folds and of said support part.

12. The method according to claim 9, wherein in said step (ii), firmly uniting said leather parts and said support part, apart from the portions located underneath said folds, onto an outer face of an interface layer that was previously firmly united to an outer face of said element and interrupted at the height of each of said folds.

13. A method according to claim 1, wherein in said step (i), after having folded over said reduced-size edges, by overlapping two subsections, uniting the two subsections, one to another, by means of stitching.

14. An element for a vehicle interior, the element comprising:
first and second leather parts, each leather part having an inner face and an outer face, each leather part comprising an edge portion, the edge portion of each leather part having reduced thickness measured from the inner face and in comparison to a second portion of the leather part, each leather part having a folded region comprising at least some length of the edge portion being folded over and onto itself such that the inner surface faces toward itself; and
a visible decorative insert, the visible decorative insert extending underneath at least a portion of the folded regions of both the first and second leather parts.

15. A vehicle comprising an interior, wherein said interior comprises at least one element according to claim 14.

* * * * *